(12) United States Patent
Schmidt (10) Patent No.: US 8,156,631 B2
(45) Date of Patent: Apr. 17, 2012

(54) PROCESS FOR ATTACHING A FUNCTIONAL ELEMENT TO A FLAT MATERIAL AND A CONNECTION BETWEEN A FUNCTIONAL ELEMENT AND A FLAT MATERIAL

(76) Inventor: Heiko Schmidt, Lappersdorf (DE)

( * ) Notice: Subject to any disclaimer, the term of this patent is extended or adjusted under 35 U.S.C. 154(b) by 586 days.

(21) Appl. No.: 12/085,781

(22) PCT Filed: Nov. 28, 2006

(86) PCT No.: PCT/DE2006/002092
§ 371 (c)(1),
(2), (4) Date: May 19, 2009

(87) PCT Pub. No.: WO2007/065398
PCT Pub. Date: Jun. 14, 2007

(65) Prior Publication Data
US 2009/0297291 A1    Dec. 3, 2009

(30) Foreign Application Priority Data

| Dec. 9, 2005 | (DE) | .......................... | 10 2005 059 372 |
| Apr. 3, 2006 | (DE) | .......................... | 10 2006 015 816 |
| May 31, 2006 | (DE) | .......................... | 10 2006 025 730 |
| Jul. 6, 2006 | (DE) | .......................... | 10 2006 031 615 |

(51) Int. Cl.
*B21D 39/00* (2006.01)
*F16B 37/04* (2006.01)

(52) U.S. Cl. ...................... 29/524.1; 411/180

(58) Field of Classification Search .................. 29/524.1, 29/525.05, 428, 505, 513, 432, 512; 411/180, 411/171, 188, 182

See application file for complete search history.

(56) References Cited

U.S. PATENT DOCUMENTS

| 1,332,687 | A | 3/1920 | Reynolds |
| 1,502,399 | A | 7/1924 | Renner |
| 3,602,974 | A | 9/1971 | Koett |
| 6,318,940 | B1 | 11/2001 | Mitts |
| 2004/0042870 | A1 | 3/2004 | Parker |

FOREIGN PATENT DOCUMENTS

| DE | 42 39 584 | 5/1994 |
| EP | 0 539 793 | 5/1993 |
| EP | 1 500 461 | 1/2005 |
| EP | 1 674 741 | 6/2006 |
| FR | 2 792 270 | 10/2000 |
| JP | 03 028514 A | 2/1991 |

*Primary Examiner* — John C Hong
(74) *Attorney, Agent, or Firm* — Welsh Flaxman & Gitler LLC (57) ABSTRACT

Process for attaching a functional element to a plastically deformable flat material or workpiece, the functional element on a contact surface having a rivet collar which is formed by a hollow or tubular section and which stands away over this surface, in the joining area in the flat material by plastic deformation a dome-like section being formed which with its base projects over the plane of the flat material surrounding this section and on the base has a joining opening, and the attachment of the functional element to the flat material in a joining and riveting process taking place by insertion of the rivet collar into the joining opening and by plastic deformation of the rivet collar such that the base is held in a region of the base which surrounds the joining opening between the deformed rivet collar and the contact surface or end side of the functional element, the functional element being anchored on the edge region which surrounds the joining opening without reducing the diameter of the joining opening.

34 Claims, 10 Drawing Sheets

PROCESS FOR ATTACHING A FUNCTIONAL ELEMENT TO A FLAT MATERIAL AND A CONNECTION BETWEEN A FUNCTIONAL ELEMENT AND A FLAT MATERIAL

BACKGROUND OF THE INVENTION

The invention relates to a process for attaching a functional element to a flat material and a connection between a functional element and a flat material.

Processes for attaching or fixing functional elements, especially of connecting elements such as nuts, bolts or the like to a flat material, for example to a workpiece which has been produced from a flat material, are known in the most varied versions.

Processes for attaching or fixing functional elements and connecting elements such as nuts, bolts or similar connecting elements to a flat material or a workpiece which has been produced from this material are known in different versions. Thus, in particular a process is also known in which the connection or fixing of the respective functional element takes place by riveting in the region of a dome-like section which has been produced from the flat material by permanent or plastic deformation, i.e. by drawing or pressing (EP 539 793 B1). In this known process, after joining and during riveting of the rivet collar provided on the functional element the dome-like section is deformed back such that the diameter of the joining openings in the flat material is reduced and thus its edge is pressed against the rivet collar to produce a radial compressive annular strain, to achieve additional anchoring. This process requires a relatively complex tool. Furthermore it has been shown that against expectations with this process a significant improvement of anchoring and resistance of the functional element to being torn out in the workpiece and in the flat material is not achieved.

It is an object of the invention to devise a process which can be carried out with simplified means and which still enables anchoring of functional elements in a flat material with high resistance to tearing out.

SUMMARY OF THE INVENTION

In the invention, the respective functional element is attached to the flat material or to a workpiece of flat material in the region of a dome-like section or to a joining opening which is formed on the base of this section by riveting of the respective rivet collar, i.e. by joining and plastic deformation of this rivet collar, deformation of the dome-like section such that the diameter of the joining opening is reduced however does not take place. The functional element is anchored solely by riveting, i.e. solely by the deformed rivet collar extending behind the flat material in the region of the joining opening.

In one preferred embodiment of the invention, the forming of the dome-like section and the riveting take place in a single tool, in this tool first the dome-like section being formed and then after forming this section joining and riveting of the functional element taking place successively in time.

"Flat material" for the purposes of this invention is a flat material of a permanently deformable substance, especially of a metallic substance, for example steel, and also a workpiece which has been produced from this flat material.

A "functional element" for the purposes of this invention is defined quite generally as an element which has been attached in such flat material, especially also a connecting element, such as for example a nut, bolt, or the like.

BRIEF DESCRIPTION OF THE DRAWINGS

The invention is detailed below using figures on embodiments.

DETAILED DESCRIPTION OF THE INVENTION

Figure 1:
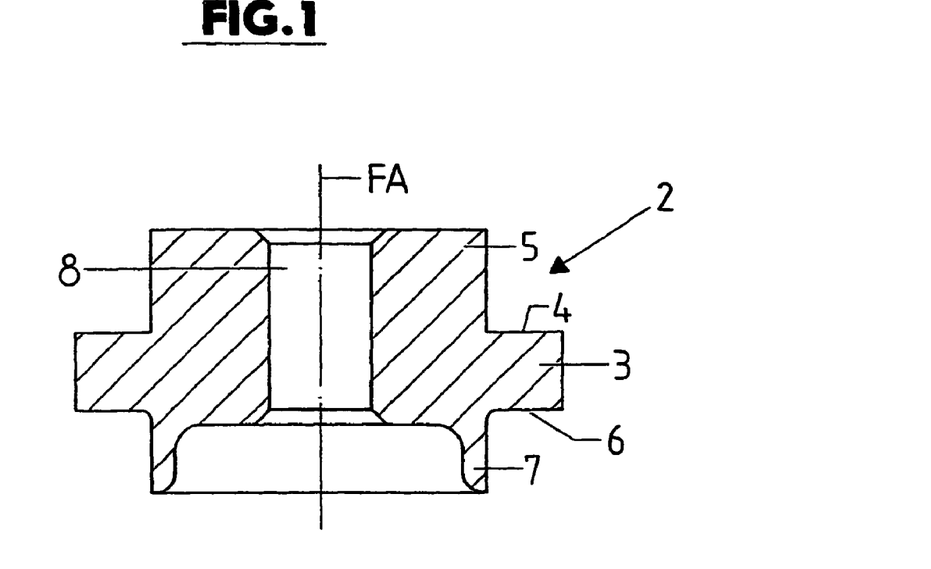
FIG. 1 shows in a simplified representation and in a section a functional element or joining element in the form of a rivet nut.
Figure 2:
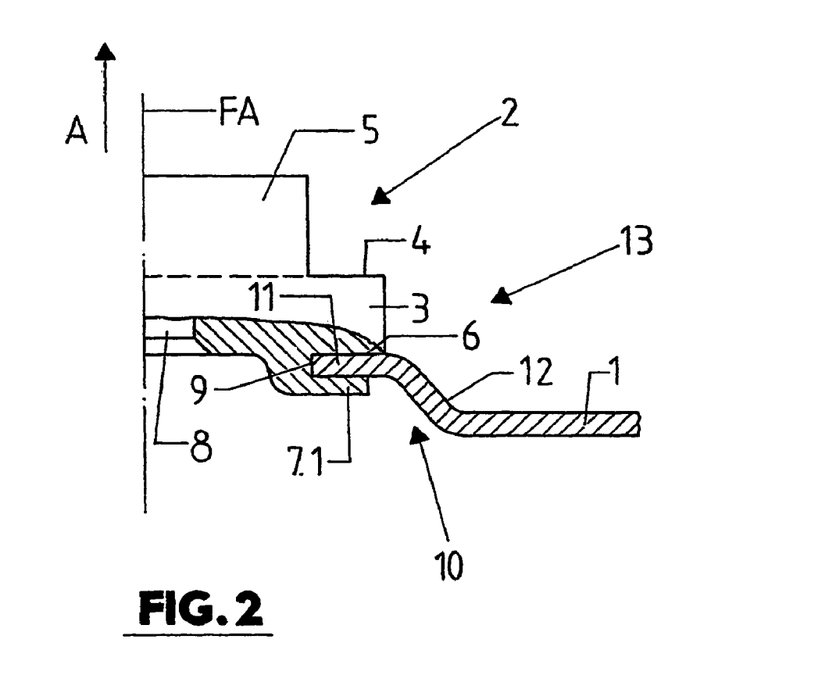
FIG. 2 shows in a simplified representation, partially in a section, a connection between the functional element of FIG. 1 and a flat material.
Figure 3:
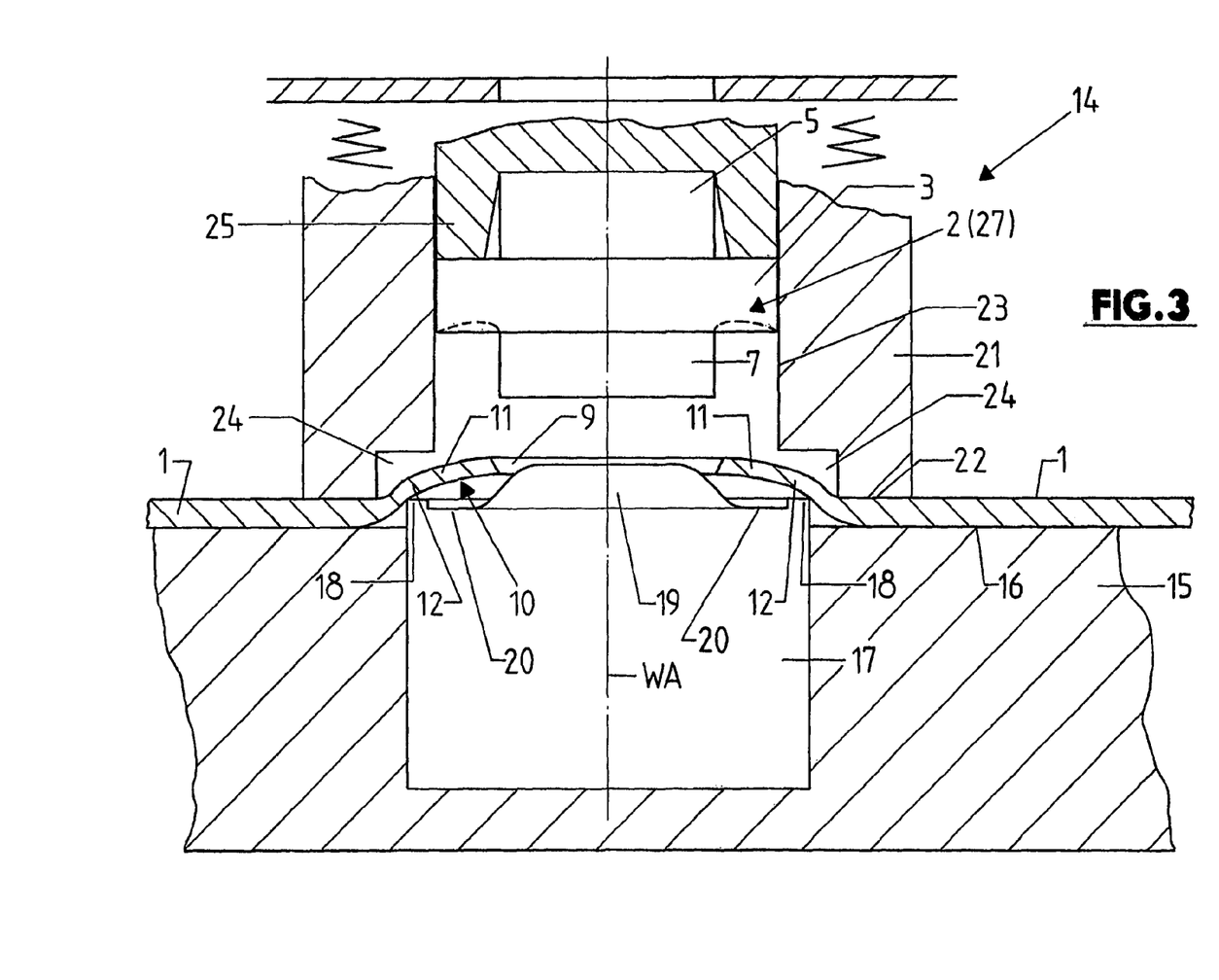
FIG. 3 shows in a simplified representation a tool arrangement for attachment of the functional element of FIG. 1 in the flat material.

In FIGS. 1-3 a flat material of a permanently deformable substance, for example a metal or steel sheet, is labelled 1, and a functional element in the form of a rivet nut which is held in the flat material 1 according to FIG. 2 by joining and riveting in the flat material 1 is labelled 2. The functional element 2 is produced from a metallic material, for example from steel, which is suitable for these elements, and with a flange section 3 which in the illustrated embodiment has a circularly cylindrical peripheral surface, with an attachment section 5 which stands away over the end side 4 of the flange section 3 which is the upper side in FIG. 1, and with a rivet collar 7 which is hollow or has the shape of a circular cylinder in the not yet riveted state and which stands away over the end side 6 which is the lower one in FIG. 1; the outside diameter of the collar in the same manner as the outside diameter of the fastening section 5 is smaller than the outside diameter of the flange section 3. The cylindrical outside surfaces of the sections 3 and 5 and of the rivet collar 7 in the not yet riveted state are each provided concentrically to the common axis FA of the functional element 2. A hole is labelled 8 which is open at least on one end, which is provided preferably with an internal thread, and which is made equiaxial to the axis FA in the flange section 3 and also in the fastening section 5, and its diameter is smaller than the inside diameter of the rivet collar 7 in the not yet riveted state.

Wherever the functional element 2 is attached in the flat material 1, a joining opening 9 is made in this flat material. Furthermore the flat material 1 in the region of this joining opening 9 is permanently deformed, such that the dome-like section which is labelled 10 forms a circular, planar or essentially planar base 11 in which in the middle there is a joining opening 9, and which is spaced apart from the end of the flat material 1. In the illustrated embodiment the plane of the base 11 lies parallel or roughly parallel to the plane of the flat material 1. The joining opening 9 has a diameter which is roughly equal to the outside diameter of the rivet collar 7 in the unriveted state, but is smaller than the diameter of the base 11 which in the illustrated embodiment is equal to or roughly equal to the outside diameter of the flange section 3. The edge of the section 10, which edge has the shape of a truncated cone, is labelled 12. If the joining opening 9 is produced prior to forming of the dome-like section, this takes place such that the diameter of the joining opening 9 in the not yet deformed flat material 1 is greater than or equal to the outside diameter of the rivet collar 7.

The functional element 2 is connected to the flat material 1 by riveting after shaping of the dome-like section 10, i.e. by increasing insertion (joining) of the riveted collar 7 into the joining opening 9 and by simultaneous deformation of the rivet collar 7 such that the region of the base 11 which surrounds the joining opening 9 is clamped between the deformed rivet collar 7.1 which is located on the concave side of the dome-like section 10, and the end side 6 which forms the contact surface for the flat material 1 and which is located on the convex side of the dome-like section 10. This connection which is generally labelled 13 in FIG. 2 between the flat material 1 and the functional element 2 takes place without reshaping of the dome-like section 10 and without a reduction of the diameter of the joining opening 9. Since the latter is provided in the planar base 11 and also the deformed riveted collar 7.1 extends behind this planar base 11 in the region of the joining opening 9, i.e. on the bottom of the flat material 1 and thus within the dome-like section 10, for the functional element 2 high resistance to tearing out against forces acting in the direction of axis FA (arrow A) is achieved, whereas the displaced or deformed rivet collar 7.1 with its region which lies radially outside relative to the axis FA extends into the immediate vicinity of the transition between the planar base 11 and the edge 12.

Attachment of the functional element 2 in the region of the dome-like section 10 furthermore ensures that the deformed rivet collar 7.1 can be formed in the optimum manner when riveted and this deformed rivet collar 7.1 does not project either over the side of the flat material 1 facing away from the flange section 3 or the side of the workpiece which is formed by this flat material.

FIG. 3 shows a tool arrangement 14 with which the shaping of the dome-like section 10 in the region of the joining opening 9 which has already been prepared in the flat material 1, joining of the functional element 2 or of the rivet collar 7, and riveting take place in a single tool. The tool arrangement 14 for this purpose consists of a lower tool 15 which with its top forms a planar support surface for the bottom of the flat material 1. A die 17 is inserted into the recess of the lower tool 15 which is open towards the support surface 16 and the die 17 projects with its upper end over the support surface 16 and there forms a circular ring-shaped die collar 18 which surrounds the die and tool axis WA and in the middle forms a rounded rivet head 19 which has the shape of a truncated cone and which likewise with its axis is located equiaxially to the axis WA. Between the rivet head 19 and the die collar 18 which concentrically surrounds this rivet collar the die 17 is made with a trough-like depression 20 which annularly surrounds the axis WA and which relative to the axis WA is bordered lying radially to the outside by the die collar 18 and lying radially to the inside by the conical surface of the rivet head 19. In the illustrated embodiment the die collar 17 has a roughly quadratic or rectangular annular cross section with slightly rounded edge areas.

Figure 4:
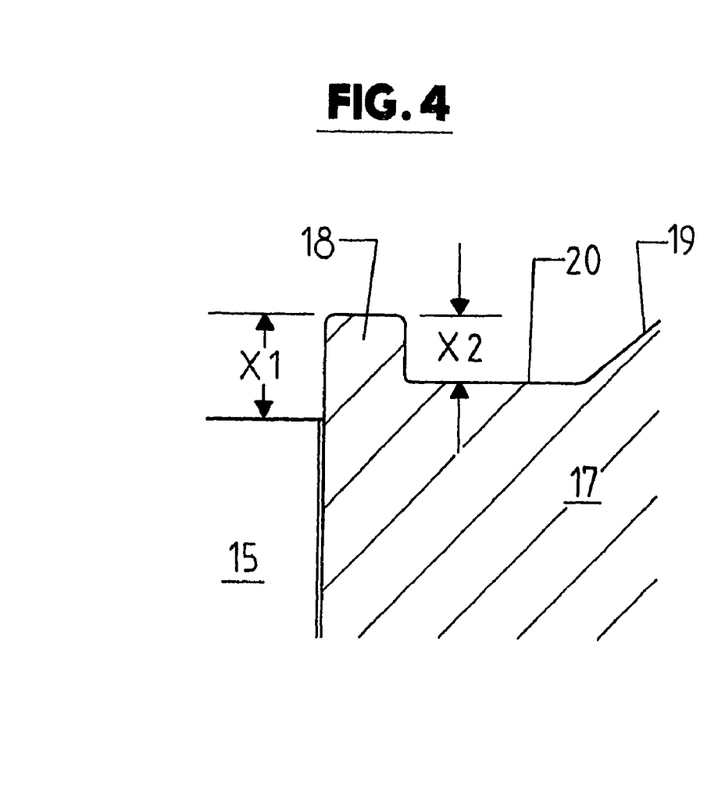
FIG. 4 shows in an enlargement a detail of a tool die.

The distance with which the die collar 18 projects over the plane of the contact surface 16 is labelled x1 (FIG. 4). The distance with which the die collar 18 projects over the plane of the bottom of the annular depression 20 is labelled x2. In the illustrated embodiment x1 is larger than x2. The distance x1 essentially determines the height of the dome-like section 10. The distance x2 determines essentially the free space between the die 17 and the bottom of the flat material 1 during riveting. The amount x1–x2 is roughly equal to the distance which the deformed rivet collar 7.1 has from the bottom of the flat material 1 which borders the dome-like section 10.

The tool arrangement 14 furthermore comprises an annular, for example, spring-loaded hold-down 21 which is arranged equiaxially to the tool axis WA and which can be lowered onto the lower tool 15 in the direction of this tool axis among others also for clamping the flat material 1 with its annular hold-down surface 22. On the planar, annular hold-down surface 22, the hold-down 21 has an inside diameter which is larger than the outside diameter of the die collar 18, by an amount which is larger than twice the material thickness D of the flat material 1. Above the hold-down surface 22 the hold-down 21 has an inside diameter which is smaller than the outside diameter of the die collar 18. In the illustrated embodiment the inside diameter of the hold-down 21 above the hold-down surface 22 is roughly equal to the inside diameter of the rivet collar 18. Between the inside surface 23 and the hold-down surface 22 the hold-down 21 is made with an annular recess 24 which forms a free space and which is open both on the hold-down surface 22 and also on the inside of the hold-down 21. In the direction of the axis WA the recess 24 has a dimension which is greater than the amount x1.

In the hold-down 21, and relative to it, in the direction of the axis WA there is a plunger 25 which can be moved axially. This plunger 25, like the hold-down 21, is a part of an upper tool, for example part of a punching head, and is actuated by an actuating means, for example by the toolholder of a press which contains the tool arrangement 14, which holder can move up and down. The plunger 25 is made on its end side facing the lower part 14 of the tool or the die 17 such that the functional element 2 which is to be connected to the flat material 1 is held there and is entrained with the lowering plunger 25.

The manner of operation of the tool arrangement 14 can be described as follows:

The flat material 1 with the hold-down 21 and plunger 25 raised is inserted into the tool arrangement 14 such that the joining opening 9 which has already been perforated beforehand in the still flat material 1 with its axis is located as exactly as possible equiaxially with the tool axis WA. This can be achieved for example by positioning elements which are provided on the lower part 15 of the tool, for example positioning pins which interact with positioning regions, for example with positioning openings in the flat material 1.

After inserting the flat material 1 into the tool arrangement 14, the upper tool is lowered. In doing so, first the hold-down 21 with its hold-down surface 22 makes contact with the top of the flat material 1 so that then the dome-like section 10 is shaped by way of the die collar 18, optionally also with the concomitant action of the surface of the depression 24 which is opposite the die collar 16. After complete lowering of the hold-down 21, and after complete forming of the dome-like section 10 in the flat material 1 which is now clamped between the hold-down 21 and the annular region of the support surface 16 which surrounds the die 17, with the plunger the functional element 2 with the rivet collar 7 is supplied in advance. It or its material then increasingly travels through the joining opening with plastic deformation to under the flat material 1 and forms the deformed rivet collar 7.1 which is held for the most part in the space formed underneath the flat material essentially by the trough-like depression 20. The connecting or riveting process is completed by pressing the region of the base 11 which surrounds the joining opening 9 between the end side 6 which lies against the top of the base 11 and the deformed rivet collar 7.1 which is held underneath the flat material 1 essentially by the depression 20.

In order to achieve torsionally strong anchoring of the functional element 2 in the flat material 1 with accommodation of torque as high as possible, in the illustrated embodiment on the end side 6 there are several depressions 6.1 into which the material from the region surrounding the joining opening flows during riveting or pressing. Instead of or in addition to the depression 6.1 there can also be projections 6.2 on the end side 6 which are pressed into the material of the base 11 surrounding the joining opening 9 during riveting.

One particular feature of the tool arrangement 14 or of the process which is carried out with this tool arrangement is that in a single tool and thus also in a single pass the connection 13 is produced by forming the dome-like section 10 and by subsequent joining and simultaneous riveting of the functional element 2 in the region of the joining opening 9.

As was stated above, the quantity x1 determines the amount by which the die collar 18 projects over the plane of the contact surface 16 and thus the distance between the top of the base 11 and the plane of the top of the flat material 1 outside the dome-like section 10. The quantity x2 determines the distance between the die collar 18 and the bottom surface of the depression 20 and thus essentially also the free space underneath the flat material 1 for the plastic deformation of the rivet collar 7 and for the formation of the deformed rivet collar 7.1. The quantity x2 then also determines essentially the amount by which the deformed rivet collar 7.1. projects, i.e. the amount with which this deformed rivet collar 7.1 projects over the bottom of the flat material 1 in the region of the joining opening 9. The difference x1-x2 then determines the distance between the plane of the bottom of the flat material 1 and the deformed rivet collar 7.1.

Figure 5:
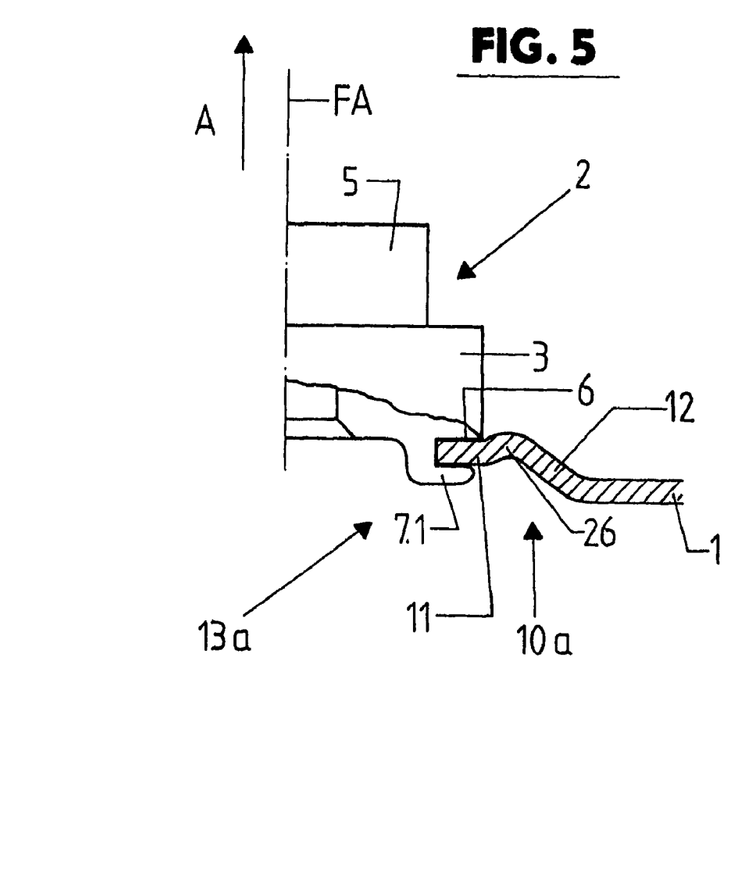
FIG. 5 shows in a representation like FIG. 1 another possible embodiment of the connection as claimed in the invention between a functional element and a flat material.

FIG. 5 shows as another embodiment of the invention a connection 13a which differs from the connection 13 among others in that the base 11 of the dome-like section 10a has a diameter which is larger than the diameter of the flange region 3, and the dome-like section 10a on the outer edge of its base 11 is shaped with an annular bead 26 which concentrically surrounds the axis FA and which passes radially outside into the edge 12 and radially inside into the planar or essentially planar region of the base 11 which is oriented parallel to the plane of the flat material, which surrounds the joining opening 9 and which after riveting is clamped between the end side 6 and the deformed rivet collar 7.1. The bead 26 is produced for example by the corresponding geometry of the die which corresponds to the die 17 or by a short overstroke or further stroke of the plunger 25 after riveting of the functional element 2 with carrying of at least one part of the die which has the rivet head 19.

The connection 13a has the additional advantage that the annular bead 26 increases the stiffness of the flat material 1 in the region of the connection 13a or in the region of the joining opening 9 and only in this way is the resistance of the connection 13a to tearing out improved. Furthermore the annular bead 26 also results in that tear-out forces acting in the direction of the axis FA or of the arrow A first lead to additional twisting of the functional element 2 on the rivet collar 7.1 in the flat material 1.

Figure 6:
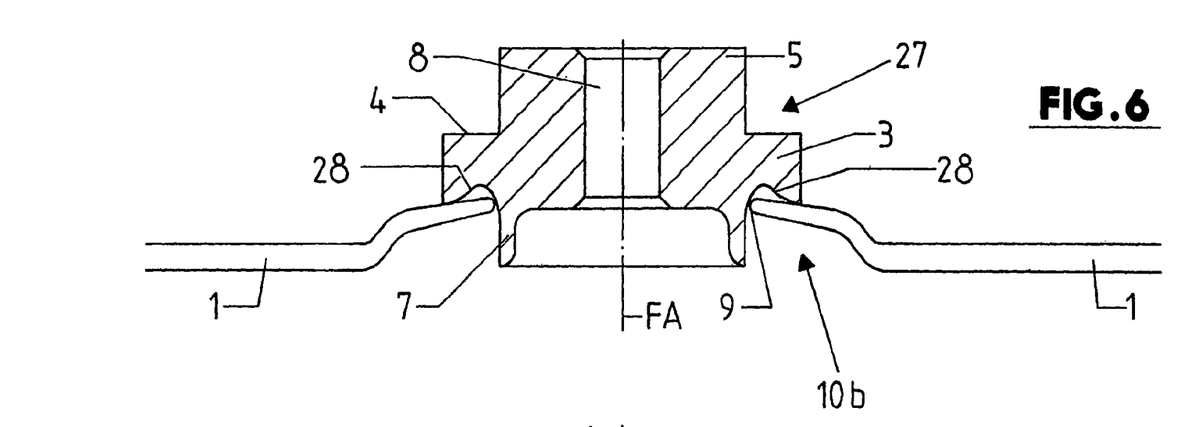
FIGS. 6 and 7 show a functional element, together with a flat material before and after production of the connection between the flat material and the functional element, according to another embodiment of the invention.

FIG. 6 shows a functional element 27 which differs from the functional element 2 essentially only in that the flange section 3 on its side facing the rivet collar 7 does not have a planar end side 6, but is made with a conical surface 28 which in the illustrated embodiment extends from the periphery of the flat section 3 to the rivet collar 7 and its axial distance increases from the free end of the rivet collar 7 with increasing distance from the peripheral surface of the flange section 3 and its conical angle opens to the side of the functional element 27 which has a rivet collar 7.

Figure 7:
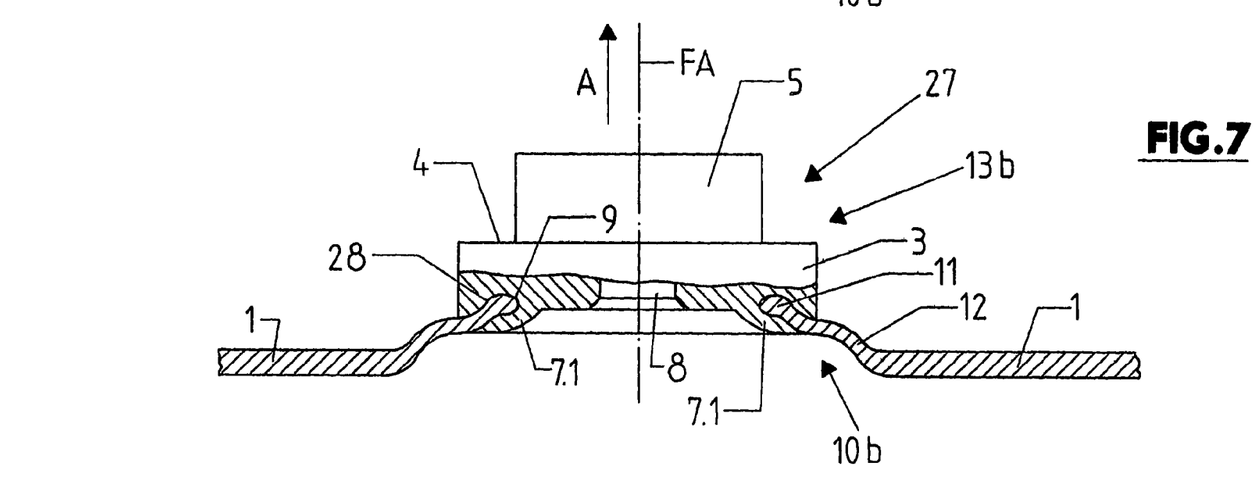

FIG. 7 shows the connection 13b between the functional element 27 and the flat material 1. This connection is implemented for example in turn with the tool arrangement 14 of FIG. 3. When the rivet collar 7 is joined and displaced, then the geometry of the depression 28 causes additional "flaring" of the flat material in the region of the dome-like section 10b which surrounds the joining opening 9 in the sense of increasing the distance from the plane of the bottom of the flat material 1, so that after completing the connection 13b the functional element 27 is held additionally in the flat material 1 with the undercut which has been formed by the conical surface 28.

Figure 8:
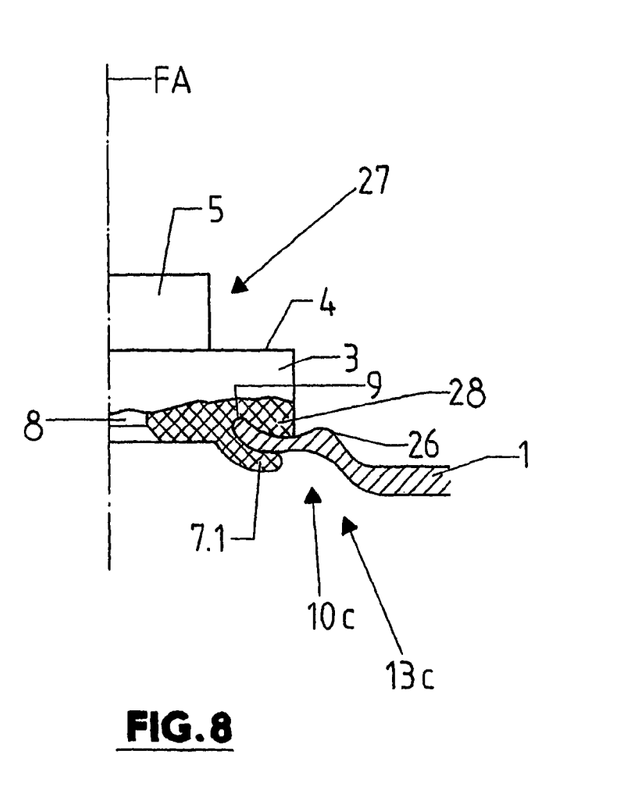
FIGS. 8 and 9 in representations similar to FIG. 1 show other embodiments of the connection as claimed in the invention.

FIG. 8 shows a connection 13c which differs from the connection 13b essentially in that in addition there is a bead 26 which is produced in turn for example by the corresponding formation of the die 17 which corresponds to the die 17 or by an additional continued stroke of the plunger 25 when the die yields.

Figure 9:
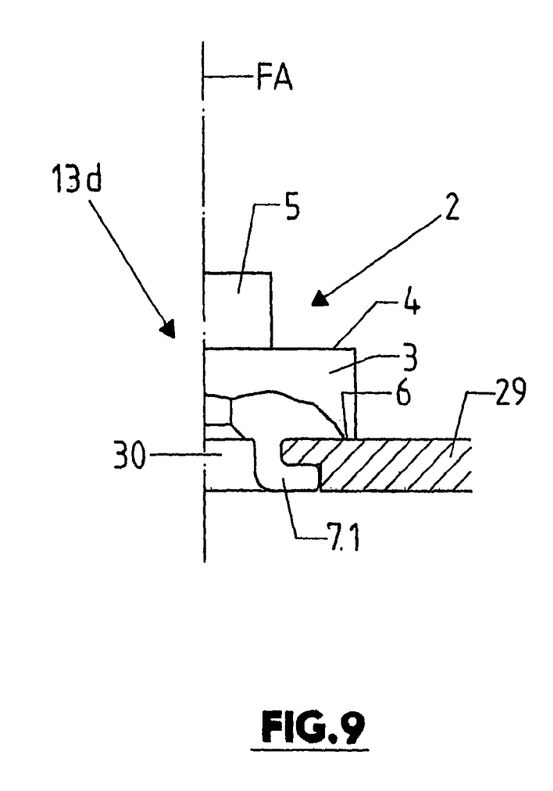

FIG. 9 shows a connection 13d between the functional element 2 and a flat material 29 of greater thickness D. Instead of the joining opening 9 there is a joining opening 30 with a diameter which increases toward the bottom of the flat material 29, i.e. to the side of the flat material 29 facing away from the flange section 3, step-shaped in the illustrated embodiment. The joining opening 30 can be produced in the most varied manner, for example by punching and embossing or for a conically widening diameter by punching and bevelling. To anchor the functional element 2 the rivet collar 7 after joining is displaced into the widening region of the joining opening 30 or is deformed within the joining opening such that a positive connection between the flat material and the functional element 2 results without the deformed rivet collar 7.1 projecting over the bottom of the flat material 1.

In FIGS. 10-13, 101 is in turn a workpiece which has been produced from a metallic flat material, for example from steel sheet, in which a connecting element made as rivet nut 102 is held by joining and riveting. The workpiece is provided with a joining opening 103 which is located on the base 104.1 of a dome-like section 104 which is produced from the flat material of the workpiece 101 by permanent or plastic deformation with an edge 104.2 which surrounds the base 104.1 and which in the illustrated embodiment is made in the shape of a truncated cone so that the corresponding cone angle opens toward the plane E2. With the edge 104.2 the dome-like section 104 relative to the axis FA of the joining opening 103 passes into the workpiece 101 outside the section 104 such that in the illustrated embodiment the plane E1 of the base 104.1 is spaced apart from the plane E2 of the remaining workpiece 101.

Figure 13:
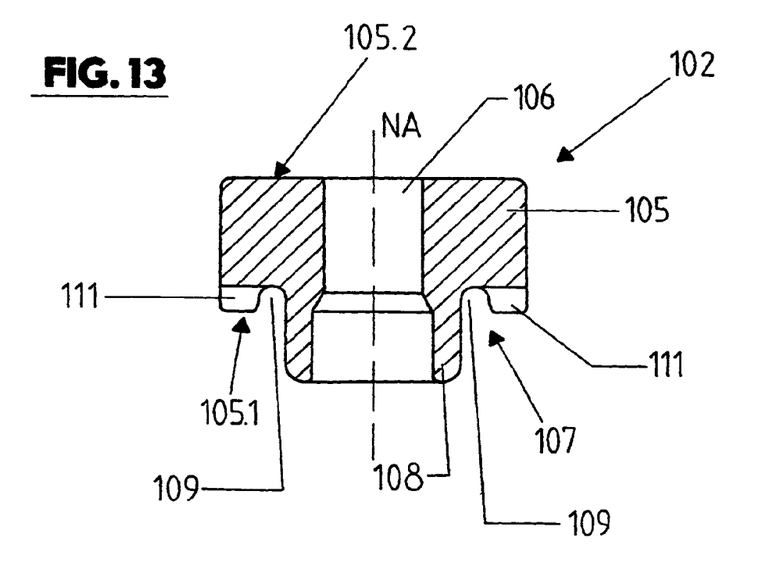
FIG. 13 shows the connecting element of FIG. 10 in an individual representation and in a section.

The rivet nut 102 which is likewise made from a metallic material which can be deformed by riveting, for example from steel, consists essentially of a rivet nut body 105 which in the illustrated embodiment on its outside surface is made in the shape of a circular cylinder to the rivet nut axis NA and has a hole 106 which is open on both ends and which is located equiaxially with the axis NA, with a nut thread. One of the two end sides of the annular body 105 forms an end side 105.1 on which the rivet nut 102 after riveting or connection to the workpiece 101 rests against the side 104.1 facing away from the plane E2. When the rivet nut 102 has not yet been worked, a rivet collar 108 projects over this end side 105.1 and is made in the manner of a hollow cylinder concentrically surrounding the axis NA, with an inside diameter which is somewhat larger than the inside diameter of the threaded hole 106 and with an outside diameter which is smaller than the outside diameter of the rivet nut body 105. The axial length of the rivet collar 108 is somewhat smaller than the axial length of the rivet nut body 108 or the distance between the end side which forms the end side 105.1 and the opposite end side 105.2 of the rivet nut body 105. In the illustrated embodiment, the axial length of the rivet collar 108 is roughly 60-70% of the axial length of the rivet nut body 105.

Figure 14:
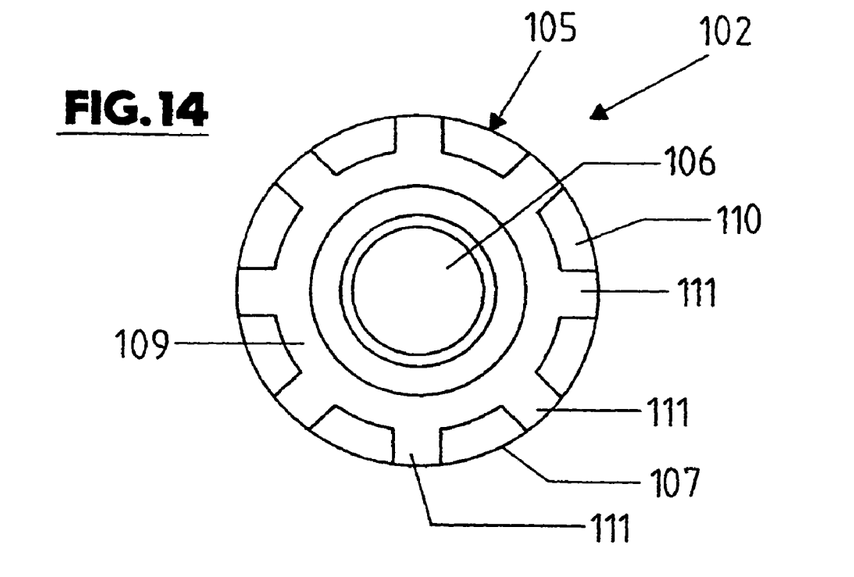
FIG. 14 shows the connecting element of FIG. 13 in a top view of its end side which has the rivet collar.

Between the rivet collar 108 and the outer edge 107 of the rivet nut body 105 in the latter on the end side 105.1 an annular groove 109 is made in the latter and surrounds the axis NA in the manner of a circular ring. The annular groove 109 is spaced apart form the outer edge 107 so that between the annular groove 109 and the outer edge 107 an annular surface 110 is formed which concentrically surrounds the axis NA and on which the end side 105.1 has groove-shaped depressions 111 so that on the annular surface 110 for transferring torque profiling is formed which consists of the depressions 111 and projections which have been formed between them. The depressions 111 extend into the annular groove 109 and reach in the illustrated embodiment as far as the periphery of the rivet nut body 105 and have a depth which is equal to the depth of the annular groove 109. The depth of the annular groove 109 and the depressions 111 can however also be different. In particular, it is possible to execute the depressions 111 such that at a greater depth than the depth of the annular groove 109 they extend into the latter, with which on the bottom of the annular groove 109 there is still additional profiling.

In the illustrated embodiment the groove 109 is directly connected to the rivet collar with its surface 109.1 which lies inside relative to the axis NA, i.e. the outer surface of the rivet collar 108 passes into the surface 109.1 of the annular groove 109. Furthermore, the execution is such that the bottom of the annular groove 109 lies in a plane E3 which is oriented perpendicular to the axis NA and which intersects the hole 106 outside the thread so that the annular material section between the surface 109.1 of the annular groove 109 and the hole 106 is part of the rivet collar which has been deformed in riveting, and the rivet nut 102 on the end side 105.1 forms a step-shaped contact surface, with which after riveting it rests against the base 104.1, and which is composed of the surface 109.2 of the annular groove 109 which lies radially outside and the adjoining annular surface 110.

Figure 10:
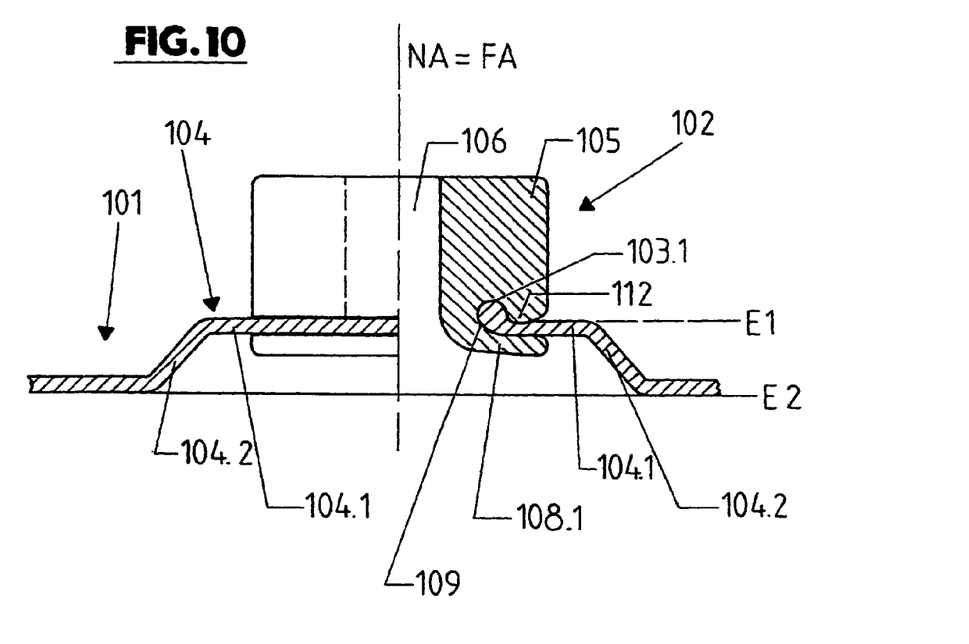
FIG. 10 shows in a simplified representation the connection between a workpiece produced from a flat metallic material, for example steel sheet, and a connecting element formed as a rivet nut, partially cutaway, in another embodiment of the invention.
Figure 11:
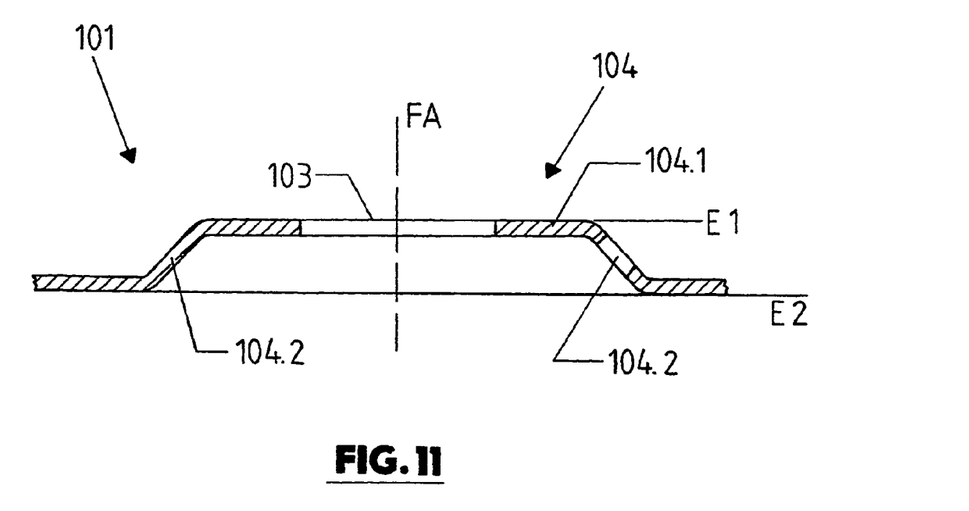
FIG. 11 shows the workpiece of FIG. 10 in the region of a preliminary hole or joining opening for the connecting element.

The rivet nut 102 is held on the workpiece 101 by inserting (joining) the rivet collar 108 into the joining opening 103 and by subsequent plastic deformation or by riveting such that the region of the base 104.1 surrounding the joining opening 103 is held between the end side 105.1 (including the annular groove 109) which is the lower one in the figures and the step-shaped contact surface which has been formed on this end side especially also by the annular groove 109 and the deformed rivet collar 108.1. In this regard the flat material of the workpiece 1 in its region of the step-shaped contact surface formed by the annular groove 109 and the annular surface 110, which region directly surrounds the joining opening 103, is accordingly plastically or permanently deformed such that in part also by flow of material an edge 103.1 is formed which has the shape of a truncated cone, which is held in the annular groove 109, and which surrounds the joining opening 103; its cone angle opens towards the plane E2 as the cross section of the joining opening 103 is enlarged. Furthermore, during riveting, due to plastic deformation of the material of the workpiece 101, constriction of the edge 103.1 takes place, roughly where this conical edge 103.1 passes into the remaining base 104.1. This constriction which annularly surrounds the joining opening 103 and which is labelled 112 in the figures is produced essentially by deformation of the material of the workpiece 101 between the annular surface 10 and the deformed rivet collar 108, but wherever the depressions 111 discharge into the annular groove 109, it can be interrupted or only reduced. The free edge of the deformed rivet collar 108.1 in the illustrated embodiment has a distance from the axis NA which is equal to or roughly equal to half the diameter of the rivet nut body 105.

Figure 12:
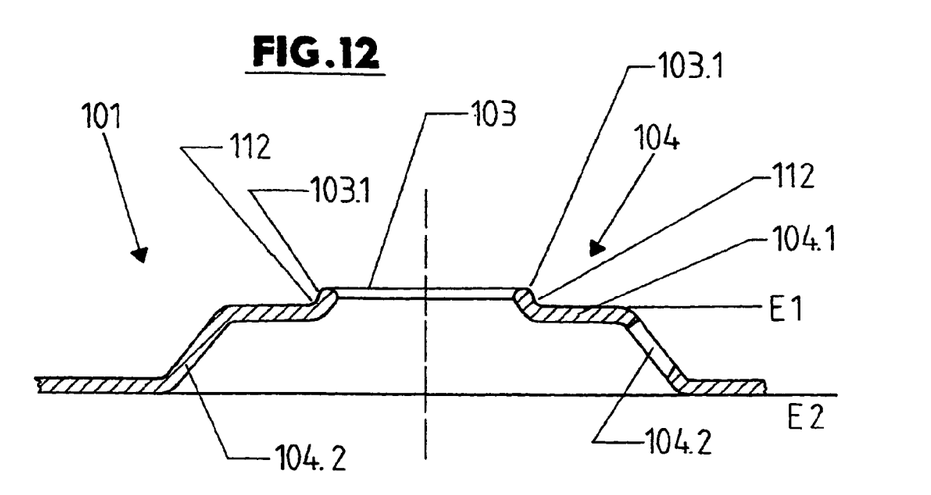
FIG. 12 shows in an individual representation the workpiece of FIG. 10 in the region of a preliminary hole or joining opening in its shaping after joining.

FIG. 12 shows the workpiece 101 in its shape which has been produced after riveting of the rivet nut 102, i.e. with the conical edge 3.1 which surrounds the joining opening 103 and with the constriction 112 on the top which faces away from the plane E2 on the transition of the edge 103.1 into the remaining base 104.1.

Due to the conical edge 103.1 which is held in the annular groove 109, which is formed during riveting and which is also tightly surrounded by the material of the rivet nut 102, and due to the constriction 112 the resistance to tearing out is high for the rivet nut 102 which is anchored in the workpiece 101 even relative to those forces which act in the axis NA and which are directed up for the representation selected for FIG. 10, i.e. away from the plane E2. Due to the projections which have been formed by the depressions 111 and which are impressed into the material of the workpiece 101 during riveting, torsionally strong anchoring of the rivet nut 102 is achieved with high torque strength.

When riveting in the region of the edge 103.1, material which may have been displaced is accommodated in the annular groove 109 without compressive annular strain acting radially to the axis NA between the edge of the joining opening and the rivet nut 102 or the rivet collar 108.

The joining and riveting of the rivet nut 102 take place in a suitable tool, its being possible to provide the workpiece 101 before joining of the rivet nut 102 with the dome-like section 104, or to form this section only in the tool in which riveting of the rivet nut 102 takes place. In any case the workpiece 101 is first provided with the joining opening 103, preferably before forming of the dome-like section 104. Furthermore, the joining opening is produced with a diameter such that during joining, the rivet collar 108 is inserted into this opening.

Figure 15:
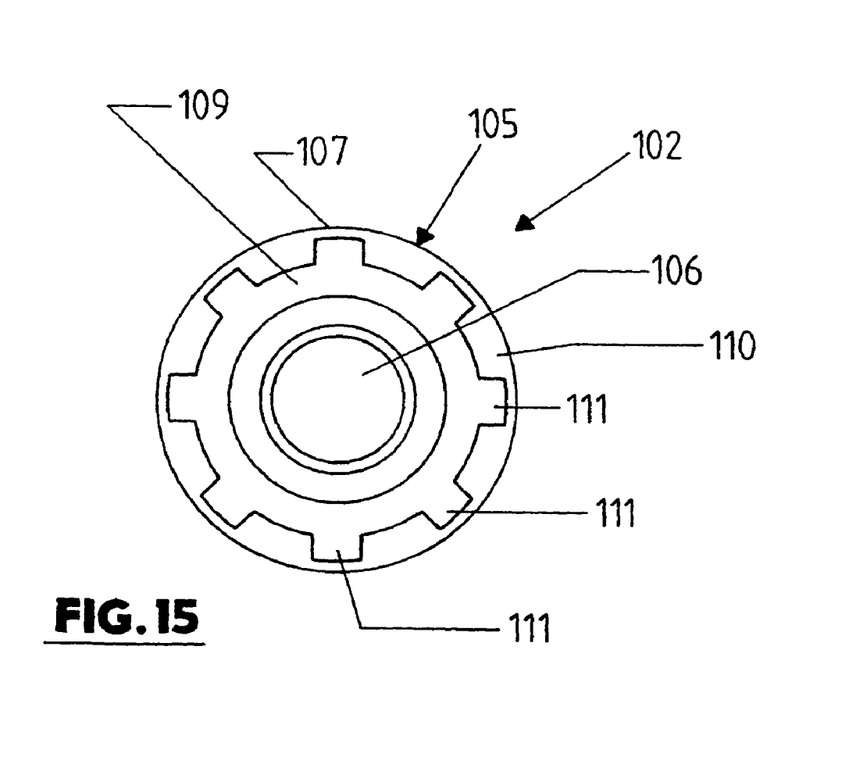
FIGS. 15 and 16 show representations similar to FIG. 14 in other embodiments.

It was assumed above that the depressions 111 extend as far as the periphery of the rivet collar 105. FIG. 15 shows a version in which the depressions 111 end with a distance from the peripheral surface 108 of the rivet nut body 105.

Figure 16:
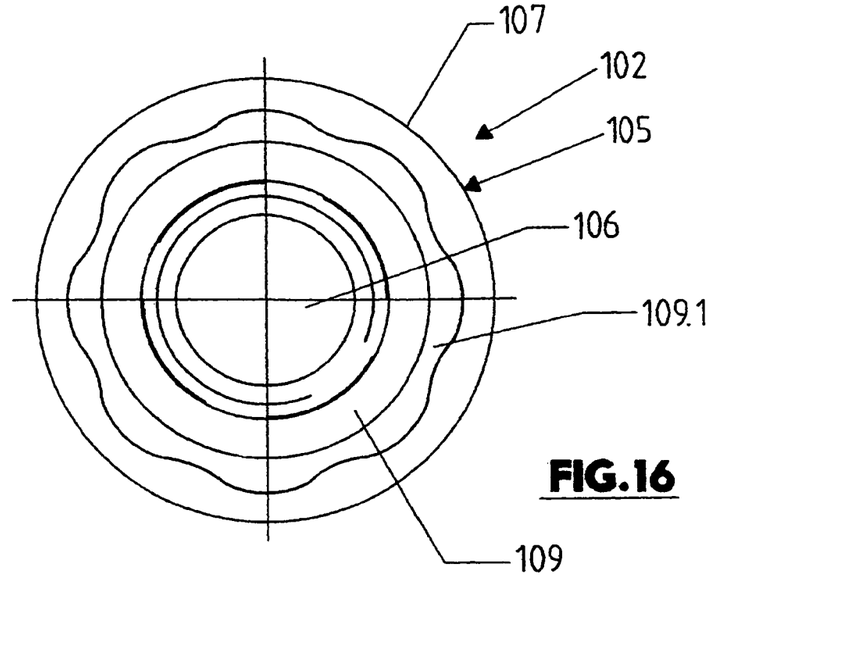

FIG. 16 shows an embodiment in which to achieve a torsionally strong connection the annular groove 109 is surrounded by a projection 109.1 which on its radially outlying edge runs in a non-circular path, specifically roughly polygonally with corner regions which are convexly curved toward the peripheral surface 107 and with sides which are concavely curved to the peripheral surface 107 and which are located in between.

Figure 17:
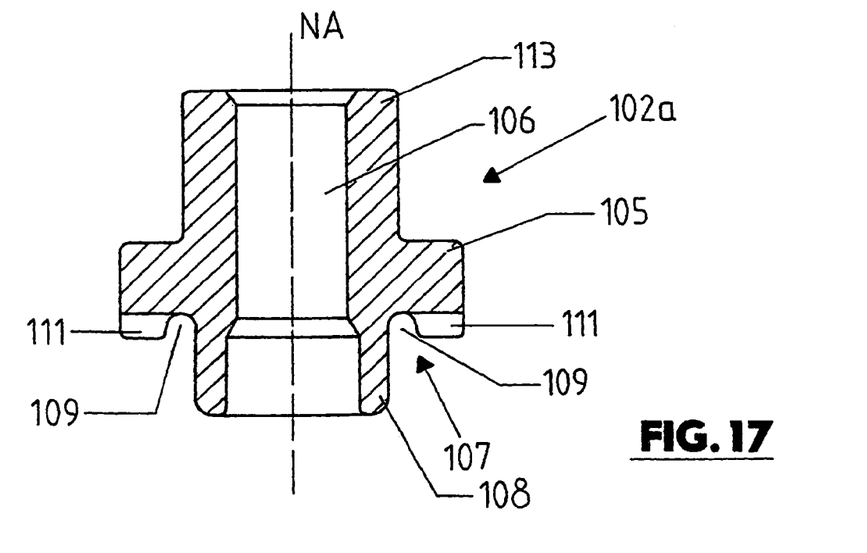
FIG. 17 shows in a representation similar to FIG. 13 another possible version of a connecting element in the form of a rivet nut.

FIG. 17 shows in a representation similar to FIG. 13 a rivet nut 102*a* which differs from the rivet nut 102 simply in that the rivet nut body 105*a* on its top end side which faces away from the rivet collar 108 and the annular groove 109 is made in one piece with a projection 113 which is located equiaxially with the axis NA, which stands away over this end side, and in which the threaded hole 106*a* continues.

Figure 18:
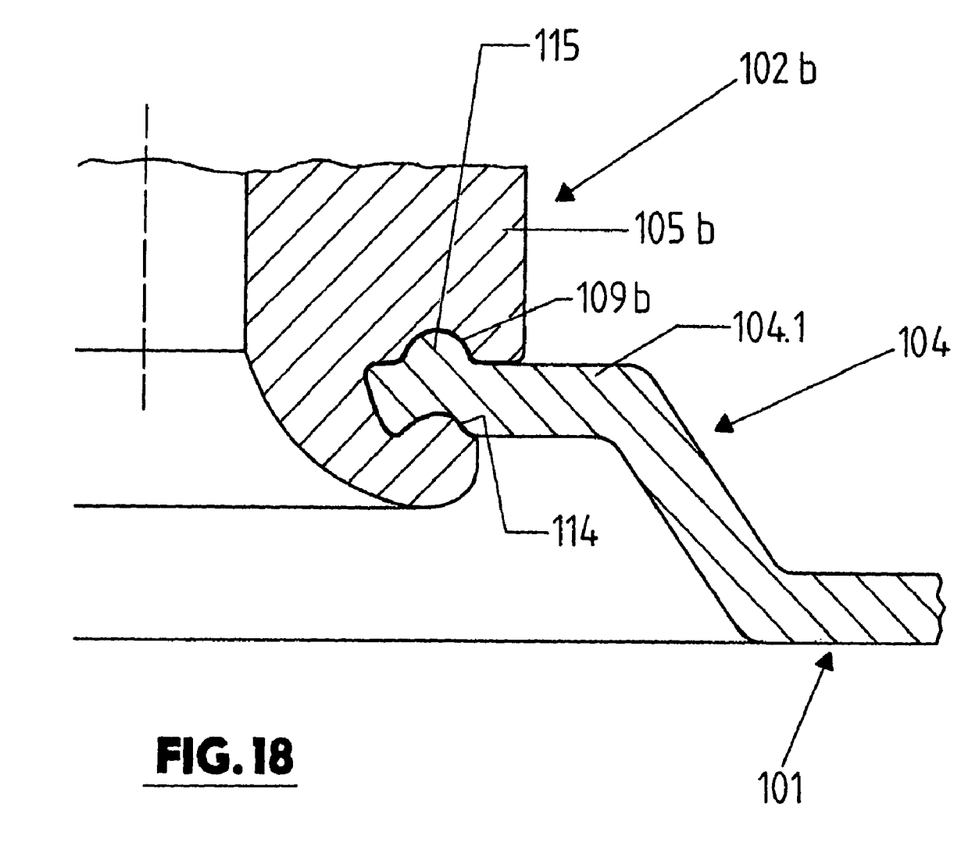
FIG. 18 shows in an enlarged partial representation the connection between a connecting element and a workpiece which has been produced from steel sheet according to another embodiment of the invention.

FIG. 18 shows in a very enlarged partial representation the connection between the dome-like section 104 of the workpiece 1 produced from sheet metal with a rivet nut 102*b* which differs from the rivet nut 102 in that the annular groove 109*b* which corresponds to the annular groove 109 is not directly adjacent to the rivet collar 108, but surrounds the rivet collar 108 at a distance, i.e. the radially inner edge of the annular groove 109*b* is spaced apart from the rivet collar 108. After inserting the rivet collar 102*b* with the not yet deformed rivet collar 108 into the joining opening 103 which has a diameter which in this embodiment is also again at most equal to, but preferably is somewhat larger than the outside diameter of the undeformed rivet collar 108, the rivet collar 108 is deformed into the rivet collar 108.1 such that the material of the workpiece 101 in the region which surrounds the joining opening 103 is clamped between the lower annular or contact surface of the groove body 105*b* which has the annular groove 109*b* and the plastically deformed rivet collar 108.1, the material of the workpiece in this connection being deformed among others plastically or by flow into the annular groove 109*b* and in this way on the one hand on the bottom of the base 104.1 facing the plane E2 a constriction 114 which surrounds the joining opening 103 forms and on the other hand an annular, bead-like projection 115 which engages the annular groove 109*b* results on the top of the base 104.1 which faces away from the plane E2. In this embodiment the constriction 114 and the projection 115 which engages the annular groove 109*b* also yield high resistance to tearing out for the rivet nut 102*b* which is anchored in the workpiece 101 especially relative to those forces which act in the axis NA and which in the representation selected for FIG. 18 are directed up, i.e. away from the plane E2. In order to achieve torsionally strong anchoring of the rivet nut 102*b* with high torque strength, in this embodiment the end side of the rivet nut body 105*b* which has the rivet collar 108 is in turn structured.

It is common to all the above described embodiments that the joining opening 103 is produced with a diameter which is at least equal to, but preferably greater than the outside diameter of the rivet collar 108.

The invention was described above using the example of rivet nuts. It goes without saying that the invention can also be used in other connecting elements, for example in clinch bolts which then on the side of the bolt head which forms the end side have a rivet collar 108, an annular groove 109 and an annular surface 110 which is provided with depressions 111 and different profiling, and in which the bolt shaft stands away over the end side, especially is concentrically surrounded by the rivet collar 108.

The invention was described above on different embodiments. It goes without saying that numerous changes and versions are possible without departing from the inventive idea underlying the invention.

It was assumed above that on the respective joining region the joining opening 9 is already made in the sheet metal or the flat material 1 even before forming the dome-like section 10, 10*a*, 10*b*, 10*c*. But of course it is also fundamentally possible to form the dome-like section 10, 10*a*, 10*b*, 10*c* first in the joining area and then to insert its base 11 into the joining opening, in turn with a diameter which is equal to or slightly greater than the outside diameter of the rivet collar 7.

REFERENCE NUMBER LIST 1 sheet metal or flat material
2 functional element
3 flange section of the functional element
4 end side
5 fastening section
6 end side
7 rivet collar
0.1 deformed rivet collar
1 hole
2 joining opening
10, 10*a*, 10*b*, 10*c* section of flat material which has been deformed into dome shape
11 base of the dome-like section 10
12 conical edge of the dome-like section 10
13, 13*a*, 13*b*, 13*c*, 13*d* connection
14 tool arrangement
15 lower tool
16 support surface on the lower tool
17 die
18 die collar
19 rivet head
20 depression
21 hold-down
22 annular hold-down surface
23 inside surface of the hold-down 21
24 recess
25 plunger
26 bead
27 functional element
28 depression or conical surface
29 flat material
30 joining opening
101 workpiece
102, 102*a*, 102*b* rivet nut
103 joining opening
104 dome-like section
104.1 base
104.2 edge
105, 105*a*, 105*b* rivet nut body
106 threaded hole
105.1, 105.2 end side
107 peripheral surface of the rivet nut body
108 rivet collar
109, 109*b* annular groove
109.1 projection
109.1, 109.2 side surface of the annular groove
110 annular surface
111 depression
112 constriction
113 projection
114 constriction
115 projection or bead
A tear-out force
D material thickness of the flat material 1 or 29
FA axis of the functional element or joining opening
NA axis of the rivet nut 102
WA tool axis
x1 projection of the die collar 18 over the plane of the contact surface 16 x2 projection of the die collar 18 over the plane of the bottom of the depression 20

What is claimed is:

1. A process for attaching a functional element to a plastically deformable flat material, the functional element on a contact surface having a rivet collar which is formed by a hollow or tubular section and which stands away over the contact surface, in a joining area of the flat material by plastic deformation, a dome-like section being formed with a base projecting over a plane of the flat material surrounding the dome-like section, the base having a joining opening, and attachment of the functional element to the flat material in a joining and riveting process taking place by insertion of the rivet collar into the joining opening and by plastic deformation of the rivet collar forming a deformed rivet collar such that an edge region on the base which surrounds the joining opening is received between the deformed rivet collar and the contact surface of the functional element, whereby the functional element is anchored on the edge region which surrounds the joining opening without reducing a diameter of the joining opening, wherein the joining opening on the respective joining region is made in the flat material before or after forming the dome-like section.

2. The process as claimed in claim 1, wherein the joining and riveting process takes place without formation of compressive annular strain between one edge of the joining opening and the functional element.

3. The process as claimed in claim 1, wherein the joining opening is produced with a diameter which is at least equal to an outside diameter of the rivet collar.

4. The process as claimed in claim 1, wherein the dome-like section prior to the joining and riveting process is formed with a planar or essentially planar base which surrounds the joining opening and which lies in the plane parallel to the plane of the flat material which surrounds the dome-like section or perpendicular to an axis of the joining opening.

5. The process as claimed in claim 1, wherein the functional element is anchored such that the edge region of the joining opening which is held between the deformed rivet collar and the contact surface lies in a plane parallel to the plane of the flat material which surrounds the dome-like section or perpendicular to the axis of the joining opening.

6. The process as claimed in claim 1, whereby the functional elements have a planar or essentially planar contact surface for the flat material.

7. The process as claimed in claim 1, wherein during the joining and riveting process an edge region area of the base which surrounds the joining opening is deformed such that the edge region which surrounds the joining opening and which is clamped between the deformed rivet collar and the contact surface is made in the manner of a conical ring.

8. The process as claimed in claim 7, wherein the edge region which surrounds the joining opening is deformed such that a conical angle of this edge region opens into the dome-like section.

9. The process as claimed in claim 7, whereby functional elements with a conical or conical ring-shaped contact surface for the flat material.

10. The process as claimed in claim 1, wherein forming of the dome-like section and the joining and riveting process take place in a single tool.

11. The process as claimed in claim 1, wherein the joining and riveting process takes place in time after forming of the dome-like section.

12. The process as claimed in claim 1, wherein in the base of the dome-like section at least one bead which surrounds the joining opening is produced.

13. The process as claimed in claim 12, wherein a bead is produced in the forming of the dome-like section or during the joining and riveting process.

14. The process as claimed in claim 13, wherein the bead is produced after the riveting and joining process.

15. The process as claimed in claim 1, wherein the functional element is a connecting element, or a rivet nut.

16. The process as claimed in claim 1, whereby use of a tool arrangement with a die, with a hold-down and a plunger, the die having a rivet head for deforming the rivet collar and a die collar which surrounds this rivet head and which projects over a support surface formed on the first tool part for the flat material and when the tool is closed with a concomitant action of the hold-down forms the dome-like section, and wherein after forming the dome-like section by moving the plunger in the direction to the rivet head, the functional element which is carried with the plunger is joined to the rivet head by joining and deforming the rivet collar.

17. The process as claimed in claim 16, wherein when using a functional element with at least one depression provided on the end side the flat material during the joining and riveting process is deformed permanently or plastically into an annular depression.

18. The process as claimed in claim 17, wherein the joining and riveting process takes place such that the flat material is constricted on the edge region which surrounds the joining opening on at least one depression between the rivet collar and the end side of the functional element.

19. The process as claimed in claim 1, wherein the flat material is deformed into at least one depression to form at least one bead-shaped projection which is held in the at least one depression.

20. The process as claimed in claim 1, wherein a width of an annular depression on the end side is smaller than the total width of the end side.

21. The process as claimed in claim 1, wherein the functional element is a connecting element, a rivet nut or a clinch bolt.

22. A process for attaching a functional element to a plastically deformable flat material, the functional element on one end side having a rivet collar which is formed by a hollow or tubular section and which stands away over a contact surface, in a joining area of the flat material by plastic deformation, a dome-like section being formed with a base projecting over a plane of the flat material surrounding the dome-like section and the base having a joining opening, and the attachment of the functional element to the flat material in a joining and riveting process taking place by insertion of the rivet collar into the joining opening and by plastic deformation of the rivet collar forming a deformed rivet collar such that an edge region on the base which surrounds the joining opening is received between the deformed rivet collar and the contact surface of the functional element, wherein when using a functional element with at least one depression provided on the contact surface the joining and riveting process takes place such that the flat material in the edge or edge region which surrounds the joining opening is constricted on at least one annular depression between the rivet collar and the contact surface of the functional element.

23. The process as claimed in claim 22, wherein the flat material is permanently or plastically deformed into the depression during the joining and riveting process.

24. The process as claimed in claim 22, wherein the joining and riveting process takes place without formation of compressive annular strain between the edge and the functional element.

25. The process as claimed in claim 22, wherein in the riveting process the flat material is permanently deformed between the rivet collar and the contact surface of the functional element opposite it for formation of at least one constriction.

26. The process as claimed in claim 22, wherein the joining and riveting process is carried out such that a material of the flat material during the riveting process is permanently deformed by plastic deformation and/or by flow into the annular depression of the functional element.

27. The process as claimed in claim 22, wherein the joining and riveting process takes place such that one edge which is held in the depression and which surrounds the joining opening at least after the riveting process has a conical ring-like surface with a cone angle which opens toward the plane of the flat material.

28. The process as claimed in claim 22, wherein the flat material in the riveting process is deformed on one side which is opposite at least one depression to form a constriction.

29. The process as claimed in claim 22, wherein during the riveting process at least one profile which is provided on the functional element, preferably on the end side or on the rivet collar, is pressed into the flat material.

30. The process as claimed in claim 29, wherein at least one profile is formed by depressions or projections.

31. The process as claimed in claim 22, whereby a functional element is used with at least one depression which is connected to the rivet collar.

32. The process as claimed in claim 22, whereby a functional element is used with a depression spaced apart from the rivet collar.

33. The process as claimed in claim 22, whereby a functional element is used with an annular depression.

34. The process as claimed in claim 22, whereby a functional element is used with a depression which runs in a noncircular path, polygonally at least on one edge region.

* * * * *